United States Patent [19]

de Broqueville

[11] Patent Number: 4,509,429
[45] Date of Patent: Apr. 9, 1985

[54] TRANSPORTATION SYSTEM UTILIZING A STRETCHABLE TRAIN OF CARS AND STRETCHABLE BANDCONVEYORS

[76] Inventor: Axel de Broqueville, 2904 Daniel, Dallas, Tex. 75205

[21] Appl. No.: 408,746

[22] Filed: Aug. 17, 1982

Related U.S. Application Data

[63] Continuation-in-part of Ser. No. 127,541, Mar. 30, 1980, Pat. No. 4,370,931, which is a continuation-in-part of Ser. No. 19,776, Mar. 12, 1979, abandoned.

[51] Int. Cl.³ .............................................. A63G 1/00
[52] U.S. Cl. ........................................ 104/25; 104/20; 104/167; 198/334; 198/792
[58] Field of Search ................... 104/18, 20, 25, 183, 104/167, 236, 237; 213/75 R; 198/335, 334, 792; 74/255 R

[56] References Cited

U.S. PATENT DOCUMENTS

| | | | |
|---|---|---|---|
| 3,462,002 | 8/1979 | Zuppiger et al. | 104/20 |
| 3,734,433 | 5/1973 | Metzner | 246/1 R |
| 3,811,385 | 5/1974 | Johnson et al. | 104/25 |
| 3,834,520 | 9/1974 | Patin | 198/335 |
| 3,881,423 | 5/1975 | Woods et al. | 104/25 |
| 4,053,044 | 10/1977 | Patin | 198/334 |

OTHER PUBLICATIONS

"A Corkscrew Railay", Scientific American, Feb. 1924; pp. 88–89.
"Transthec", Philippe Eme; Systemes de Transport Pour les Poles d'Activite, Apr. 1970, pp. 83–86.
"The Systeme de Transport Transcab", Institute Battelle, Mar. 1971.
"Transportation System Candidates for Urban Applications", Mitre Corporation, 1970.

Primary Examiner—Richard A. Bertsch
Attorney, Agent, or Firm—Schwartz, Jeffery, Schwaab, Mack, Blumenthal & Koch

[57] ABSTRACT

Disclosed is a transportation device comprised of a series of load carrying components connected together so that the distance between the components vary thereby allowing the components to move in a closed loop path. Rotatingly driven endless screws are positioned along the closed loop path and are engaged by a projection associated with the component as a particular component moves along a screw. The thread pitch of the screws is arranged to control the distance between adjacent component and the speed of the components.

36 Claims, 25 Drawing Figures

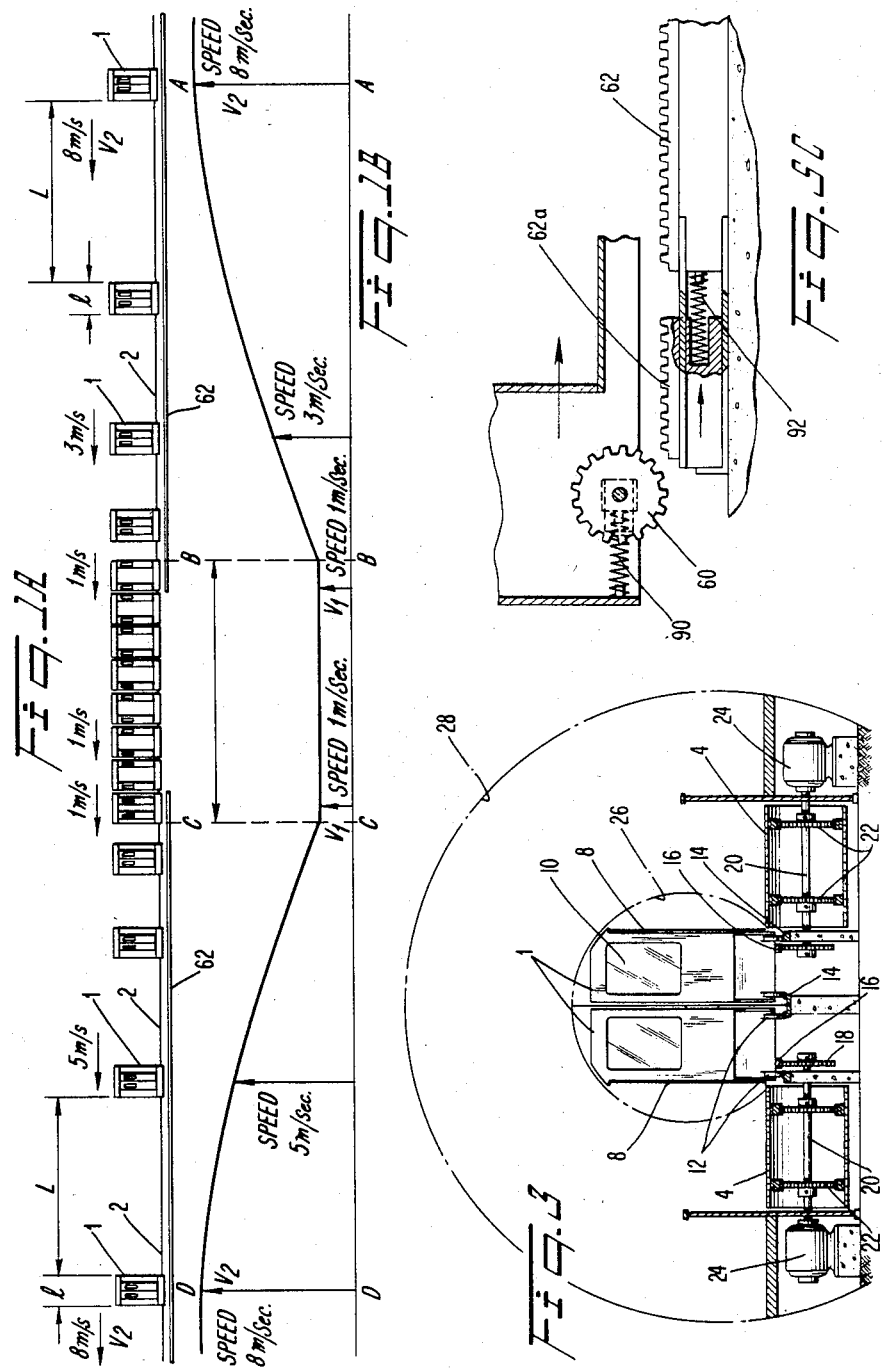

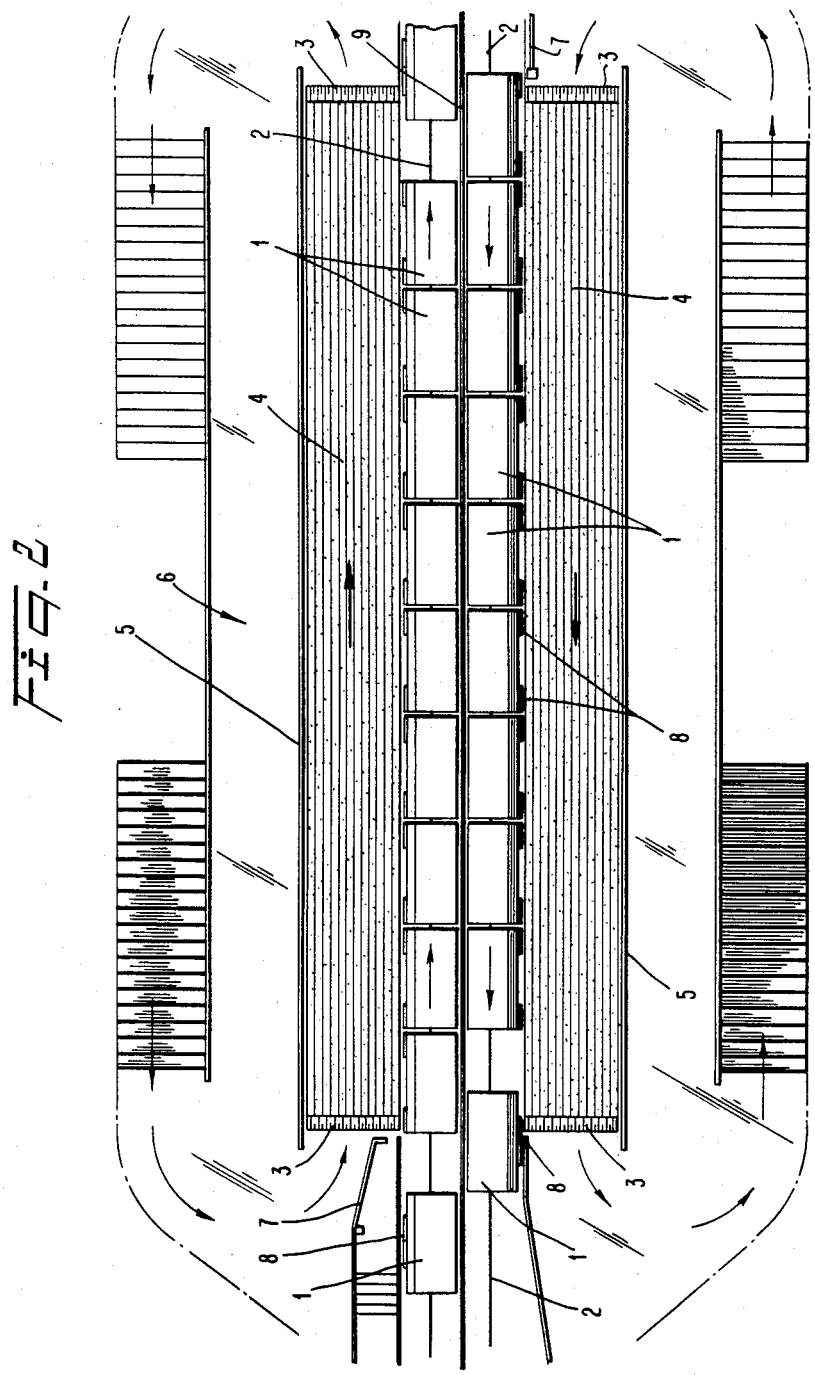

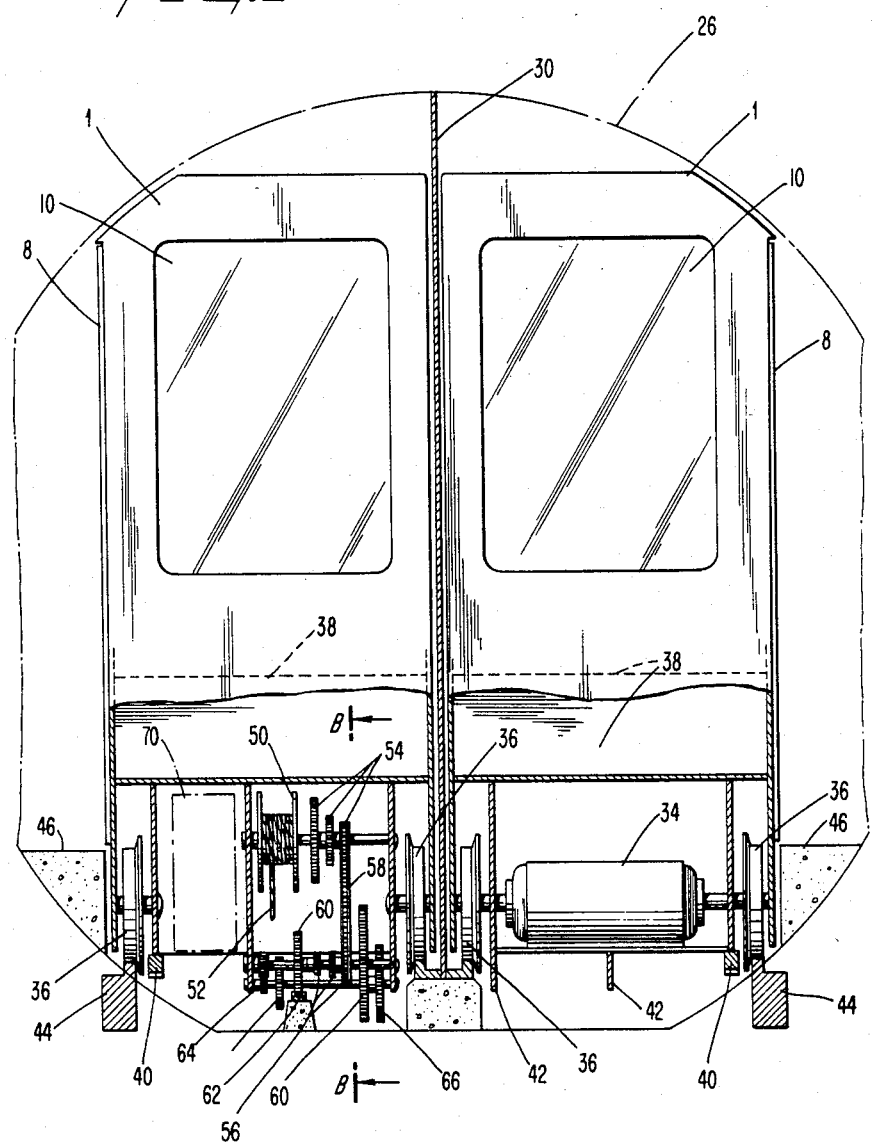

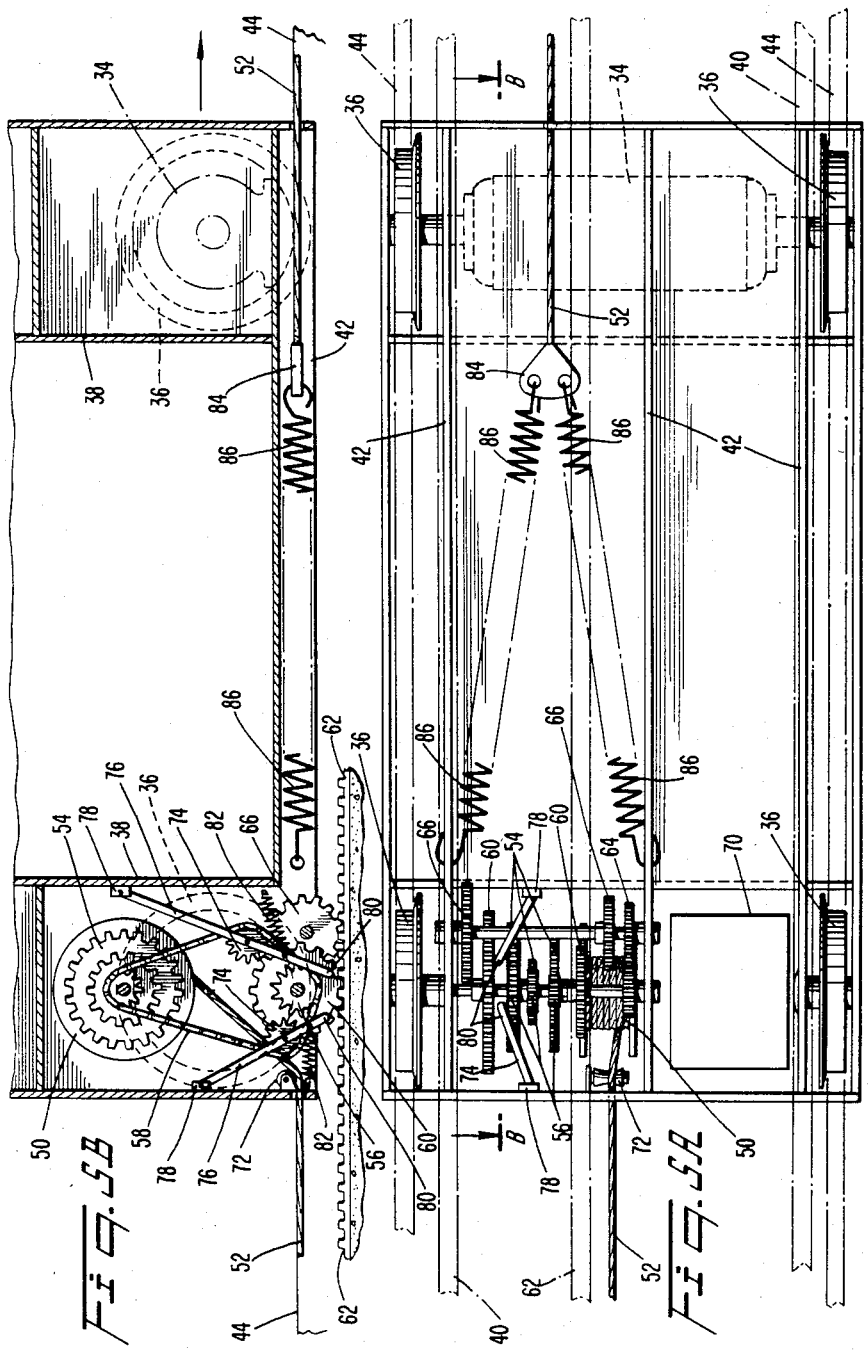

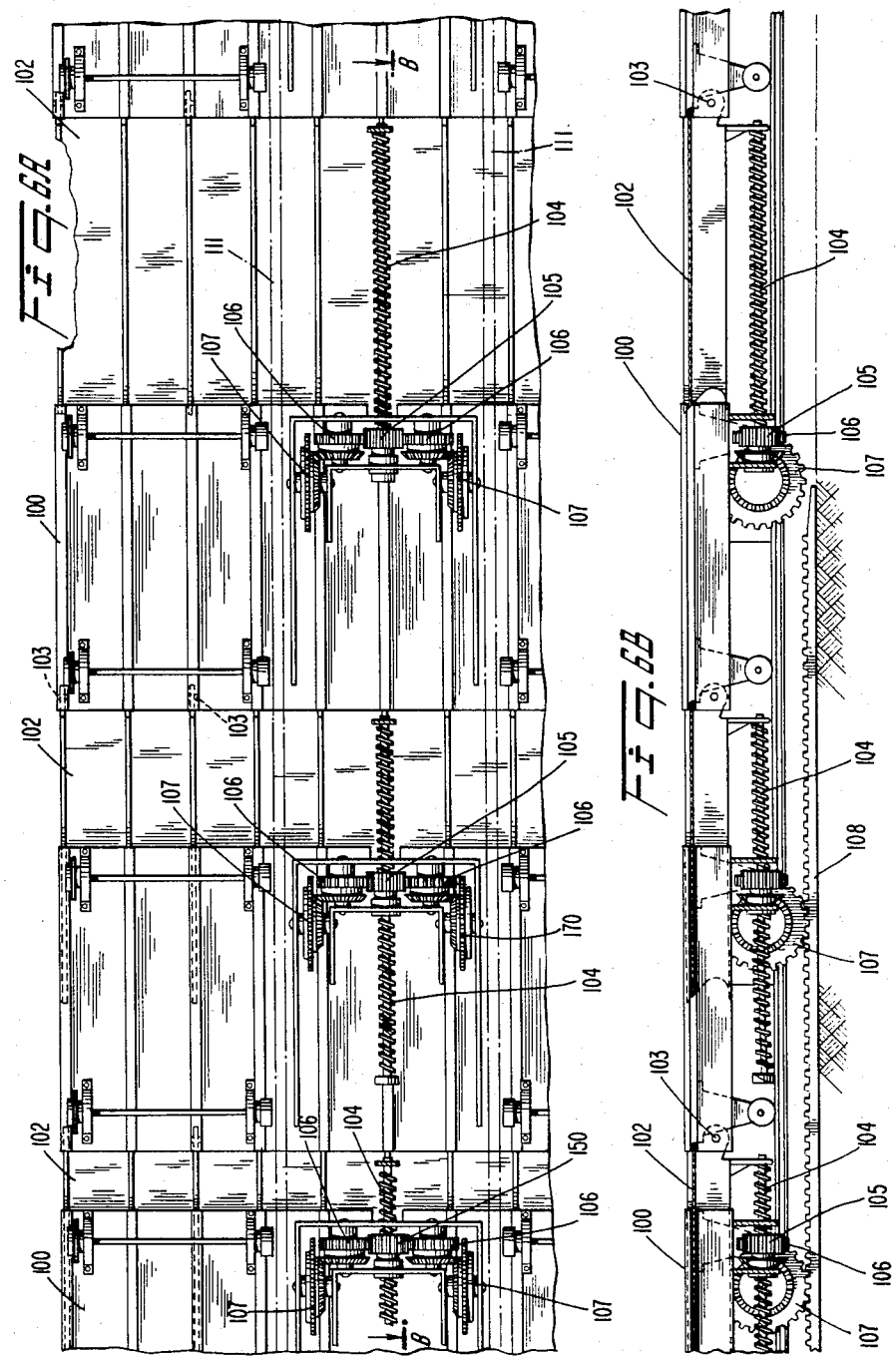

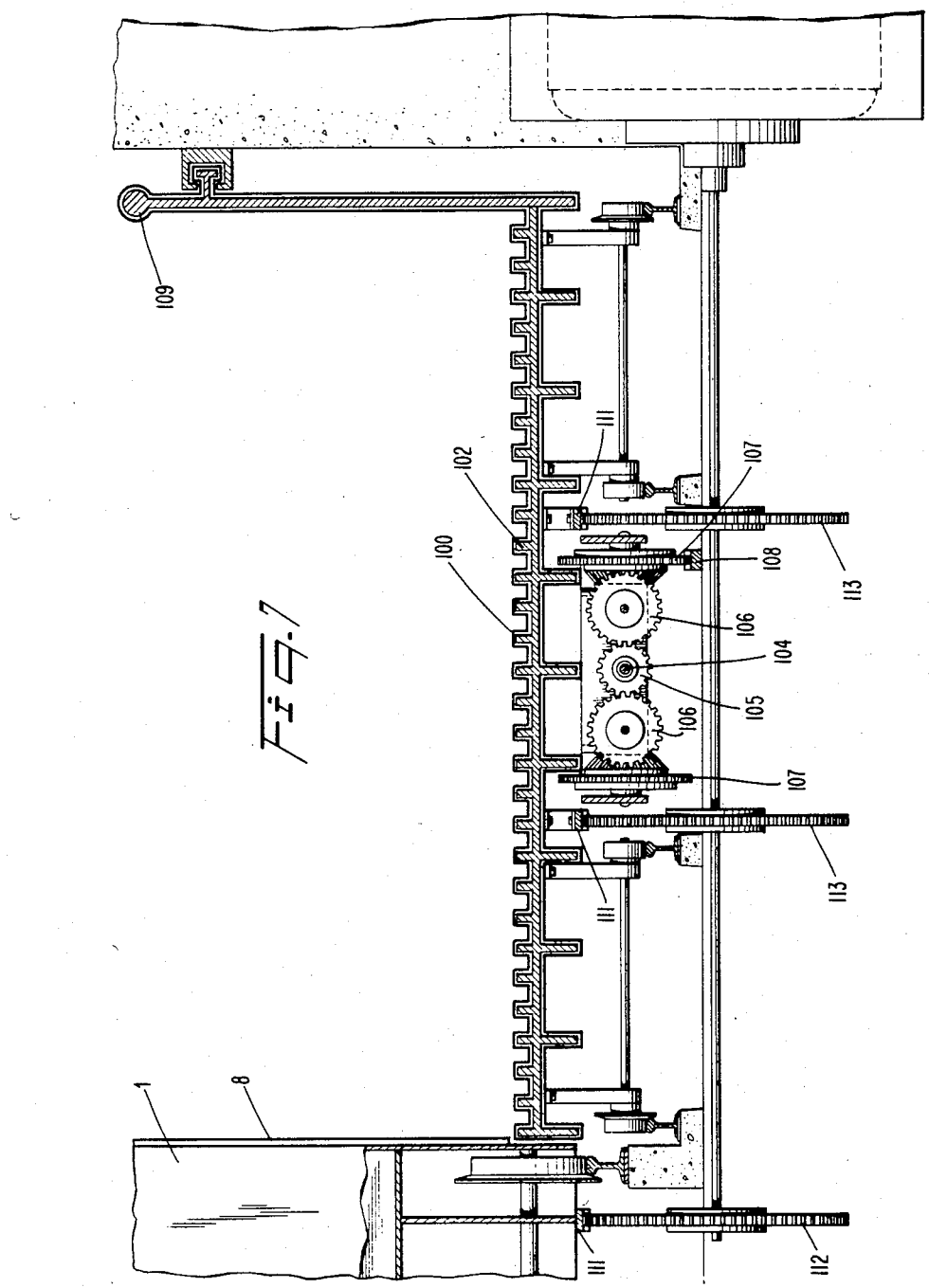

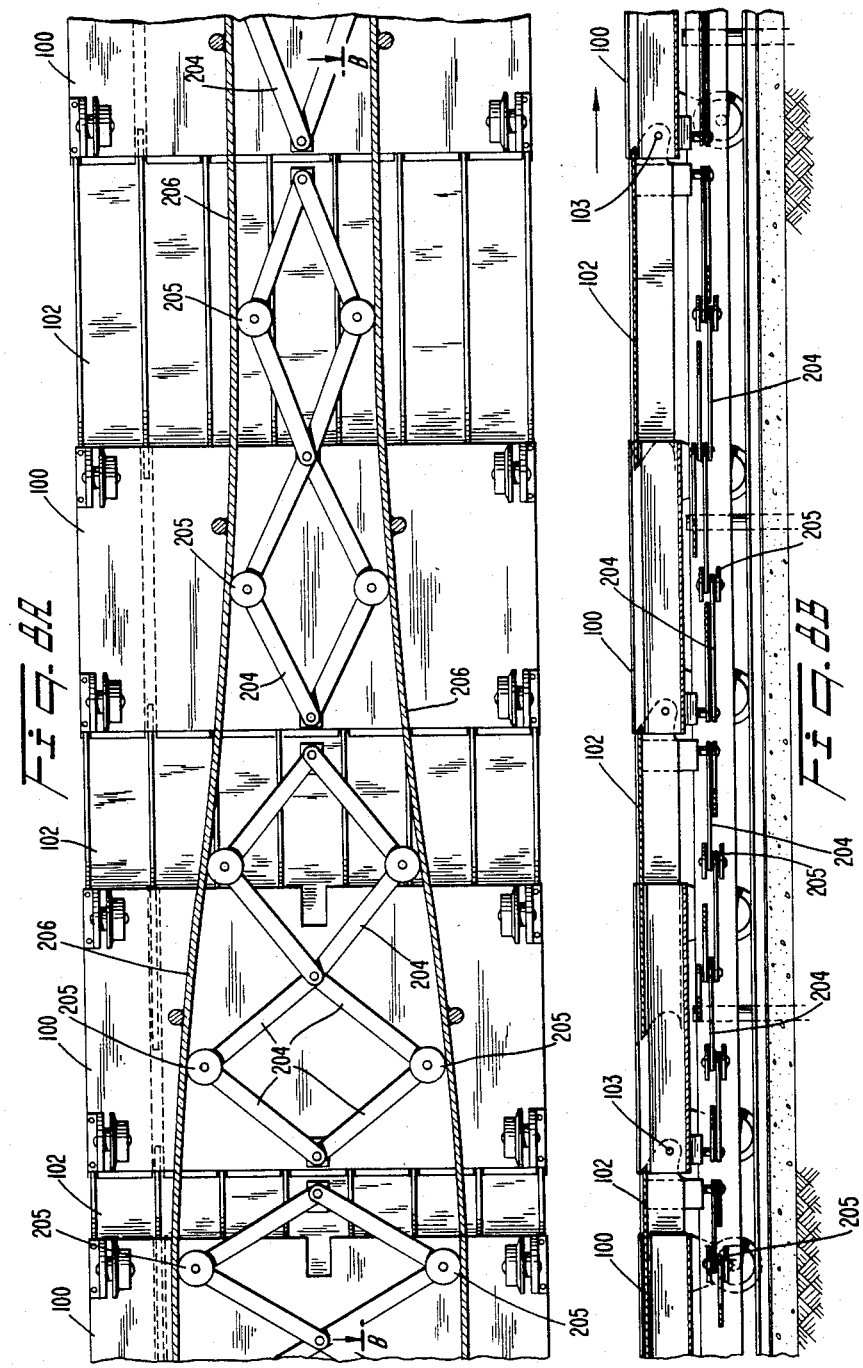

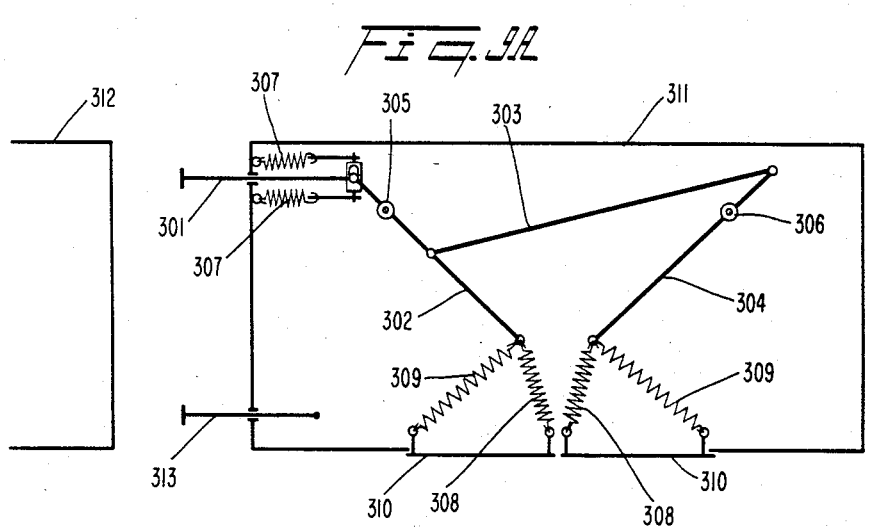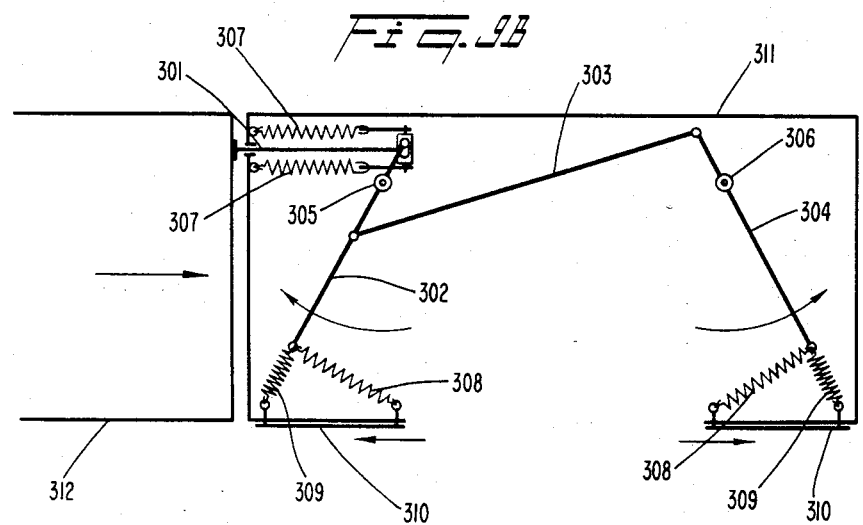

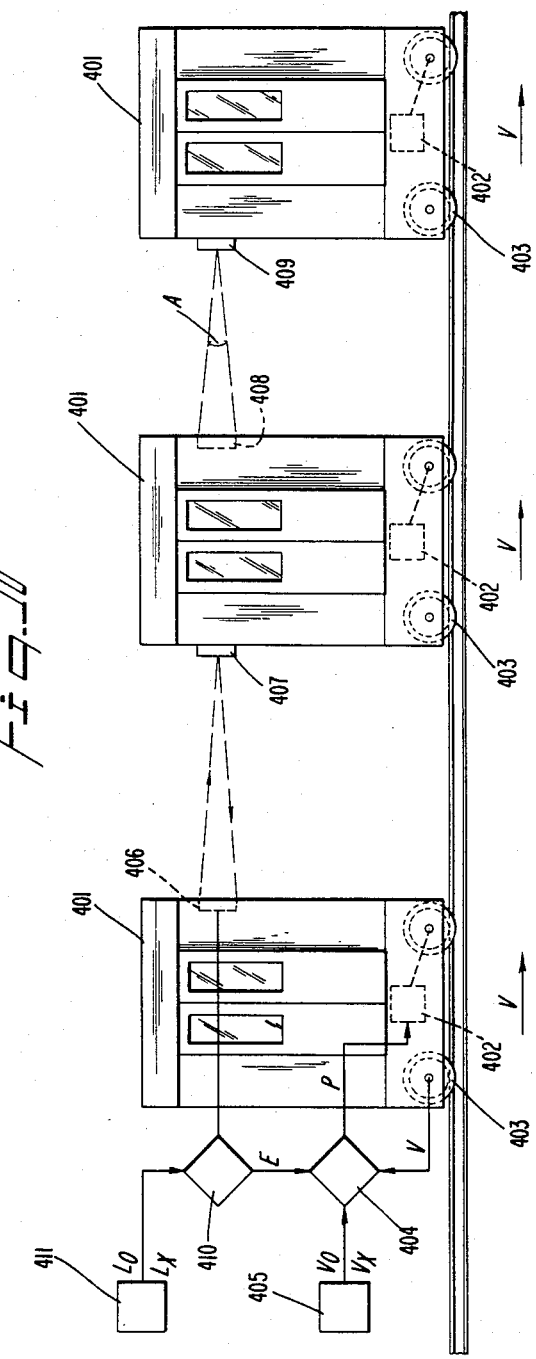

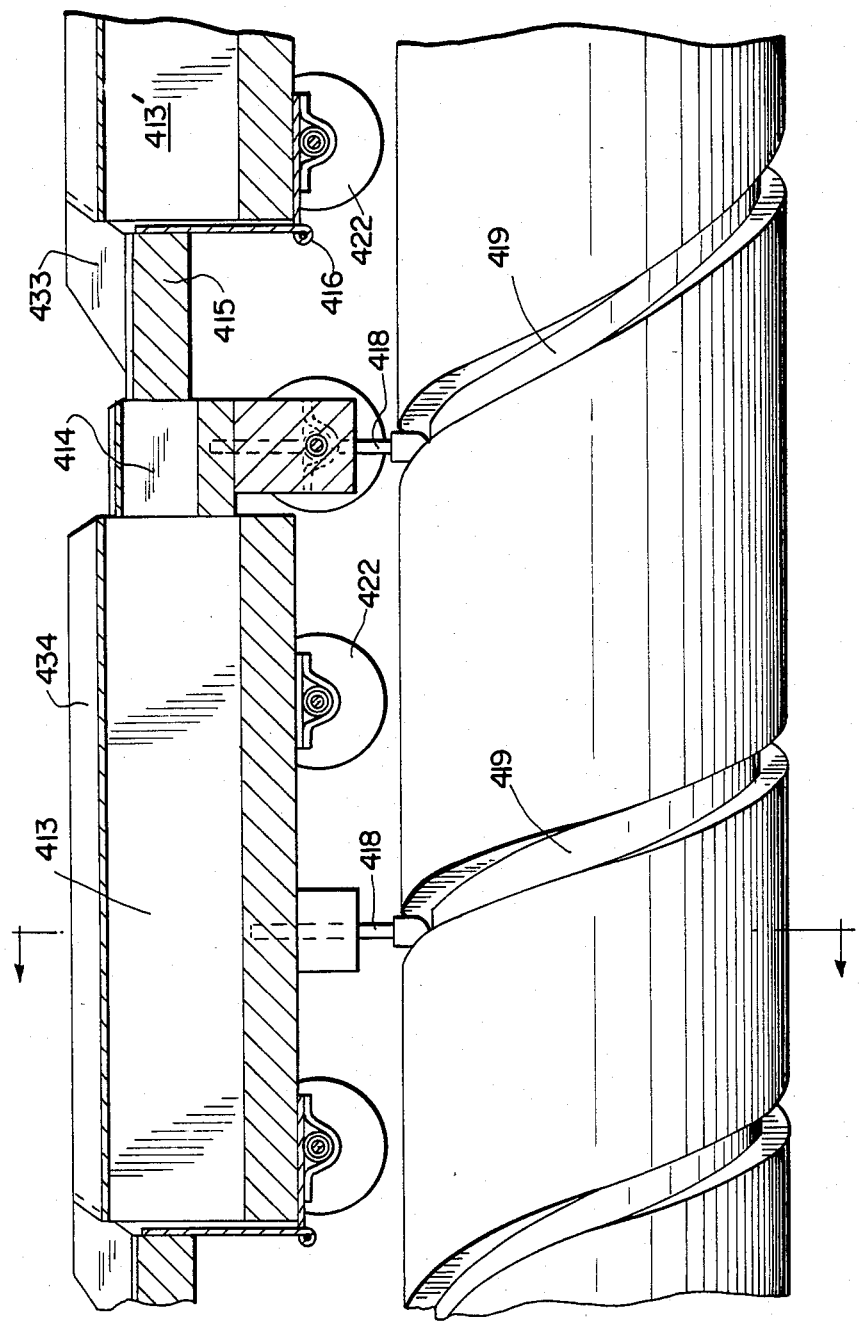

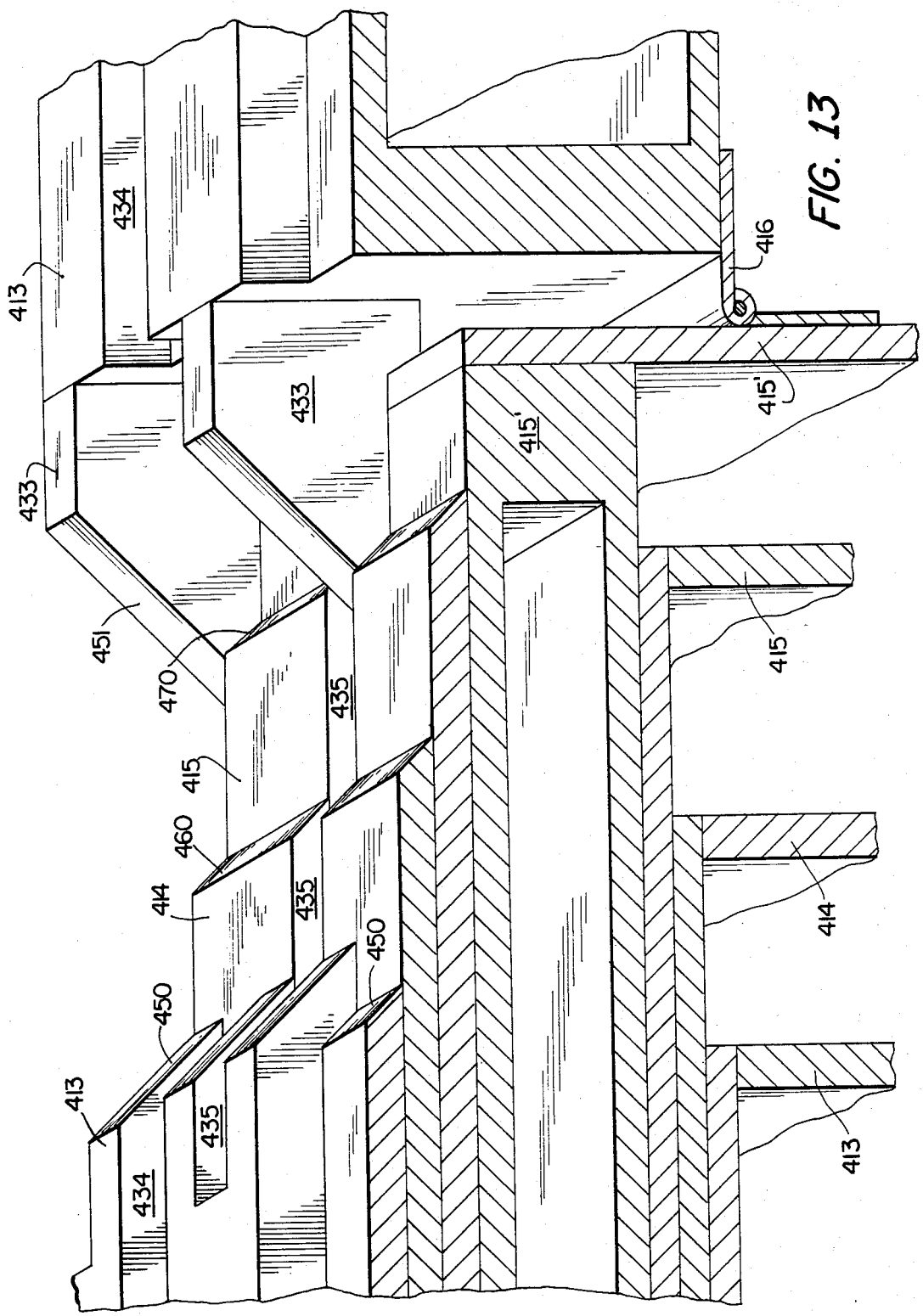

TRANSPORTATION SYSTEM UTILIZING A STRETCHABLE TRAIN OF CARS AND STRETCHABLE BANDCONVEYORS

CROSS REFERENCE TO RELATED APPLICATION

This application is a continuation-in-part of application Ser. No. 127,541, now U.S. Pat. No. 4,370,931 which is a continuation-in-part of application Ser. No. 19,776, filed Mar. 12, 1979 now abandoned.

BACKGROUND OF THE INVENTION

1. Field of the Invention

The present invention relates to conveying devices of which the components are linked together such that the distance between them varies as a function of velocity.

2. Description of the Prior Art

A stretchable bandconveyor is a bandconveyor made of a succession of elements sliding into or above each other and linked to each other by devices for varying the distance between them such that the visible length and the speed of the elements vary along their course.

A stretchable train of cars is an endless succession of cars linked to each other by devices varying the distance between them.

A stretchable and endless train of cars may be used in combination with bandconveyors at loading/unloading stations where the speed of the cars and the distance between them is at a minimum and is synchronized over some distance with the speed of the bandconveyors in order to enable people to go from the bandconveyors to the cars and vice versa.

Several variable speed bandconveyors are known in the prior art. One such device uses components which are longer than they are wide. These components slide along each other, while the relative direction of motion progressively changes from a direction perpendicular to the long side of the components to a direction parallel to it, and therefore, the speed of the components varies proportionally to the ratio of their length and width. Another example of a rotating type conveying apparatus is illustrated in U.S. Pat. No. 3,485,182. In another existing device components are driven by a single threaded rod with variable pitch.

Bandconveyors which operate at constant speeds and which are used to go into or out of cars moving at the same speed are also known in the art. Usually, those cars are attached to a cable moving at constant speed, and the distance between them is fixed. These prior art devices do not utilize controllable means for coupling the components and/or cars to achieve variable speed and variable distance operation while maintaining the components aligned, i.e. unrotated, with respect to the closed-loop path followed by the components.

Other known systems use means to control the bandconveyors but they are limited to configurations where the elements of the bandconveyors do not slide within one another or where the elements rotate perpendicularly to the direction of movement.

For instance, the device disclosed in U.S. Pat. No. 3,881,423 and French Pat. No. 2,345,329 use cables for connecting cars. However, the winding or stretching means of the cables utilize devices such as a take-up reel to control the cable lengths and moreover are not applicable to elements of a stretchable bandconveyor where the elements slide within one another.

Swiss Pat. No. 397,999 uses articulated rods for connecting elements sliding above each other as opposed to within one another. This limits the device to expansion ratios of no more than 2 to 1 without having the components rotate because of their geometry. U.S. Pat. Nos. 4,053,044 and 3,834,520 and 3,462,002 are similar to Swiss Pat. No. 397,999 but they use cables instead of articulated rods. Like the device of Swiss No. 397,999, these devices are not applicable to stretchable conveyors where the elements slide within one another.

U.S. Pat. No. 4,370,932 hereby incorporated by reference, details a transportation using a closed-loop path and a mechanism for controlling the speed of the land carrying components and their distance apart. The mechanism moves the load carrying compounds along a closed loop path without rotation of the components in a direction traversed to the closed loop path.

SUMMARY OF THE INVENTION

In accordance with the invention a transportation system is provided in which a continuous succession of components, cars or bandconveyor elements travel in a closed circuit and are linked to each other by devices which control and permit variations of the distance between them.

The cars continuously move, but before each loading-/unloading station the distance between the cars is progressively reduced to a minimum by the devices linking the cars together or by devices adjacent to the path followed by the cars. After each station, the distance between the cars is progressively increased by the same linking devices or by similar adjacent devices up to a maximum distance.

The action of increasing or reducing the distance between the cars will automatically increase or reduce the speed of the cars proportionally to the distance between the cars (including the car length). Therefore, the speed of the cars is at a minimum at the station. The loading/unloading platform at the station consists of a bandconveyor moving at a speed which is synchronized with the minimum speed of the cars.

The linking devices may include arrangements of cables and winches, nuts and threaded rods, articulated rods or electronic distance measurement and servo-mechanisms as set forth hereinafter. The aforementioned adjacent devices may include threaded rods or the like with variable thread pitch as set forth hereinafter.

The endless train of cars can be started and kept in motion by motors at each station. These motors may also drive the bandconveyors and keep their speed synchronized with the speed of the cars at the stations. The power can be transmitted to the cars, e.g., by toothed wheels which engage racks which are fixed to each car or by threaded rods with a variable pitch thread positioned along the closed loop path. Small motors can be added to each car or only to some cars to compensate for drag due to the friction and reduce stresses on the linking devices.

To increase the capacity of the system, without increasing the width of the cars it is necessary to increase their minimum speed or the speed of the bandconveyors. In the latter case a stretchable bandconveyor may be made of elements having linking means permitting the speed of the elements to be progressively increased and decreased as described in relation to the train of cars. The succession of elements are made to slide above or preferably into each other to maintain a solid surface suitable for transport of passengers.

Such a stretchable bandconveyor can be used separately or in combination with the trains of cars.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and which form a part of the specification, illustrate various embodiments of the present invention, and together with the description, serve to explain the principles of the invention. In the drawings:

FIG. 1A shows a schematic side view of a succession of cars before, within and after a station.

FIG. 1B illustrates a speed diagram showing the variations of the speed of the cars as a function of their location.

FIG. 2 illustrates a horizontal view of a station having two trains of cars going in opposite directions and two corresponding bandconveyors used as loading/unloading platforms.

FIG. 3 illustrates a section of the station of FIG. 2.

FIG. 4 illustrates an elevational view of the front and the rear of a car utilizing cables and winches driven by a set of gear-wheels.

FIG. 5A illustrates a partial view of the bottom of the car shown in FIG. 4.

FIG. 5B illustrates a partial section of the car of FIG. 5A taken along the line BB' thereof.

FIG. 5C illustrates a modification of the embodiment of FIGS. 5A and 5B using a shock absorbing device.

FIG. 6A illustrates a partial view of the bottom of an embodiment of a stretchable bandconveyor.

FIG. 6B illustrates a sectional view of the bandconveyor of FIG. 6A taken along line BB' thereof.

FIG. 7 illustrates a sectional view of the bandconveyor of FIG. 6A taken along line BB' thereof.

FIG. 8A illustrates a partial view of the bottom of another embodiment of a stretchable bandconveyor.

FIG. 8B illustrates a sectional view of the bandconveyor of FIG. 8A taken along line AA' thereof.

FIGS. 9A and 9B illustrates an arrangement of levers and springs for automatically opening and closing the car doors at a station.

FIG. 10 illustrates a measuring apparatus and an electronic servomechanism for controlling the distance and speed of the train of cars.

FIG. 12A is a detailed view of a variable pitch threaded rod of FIG. 11.

FIG. 13 is an axonometric projection of the surface of the stretchable bandconveyor of FIG. 11.

DETAILED DESCRIPTION OF THE PREFERRED EMBODIMENTS

Figure 11:
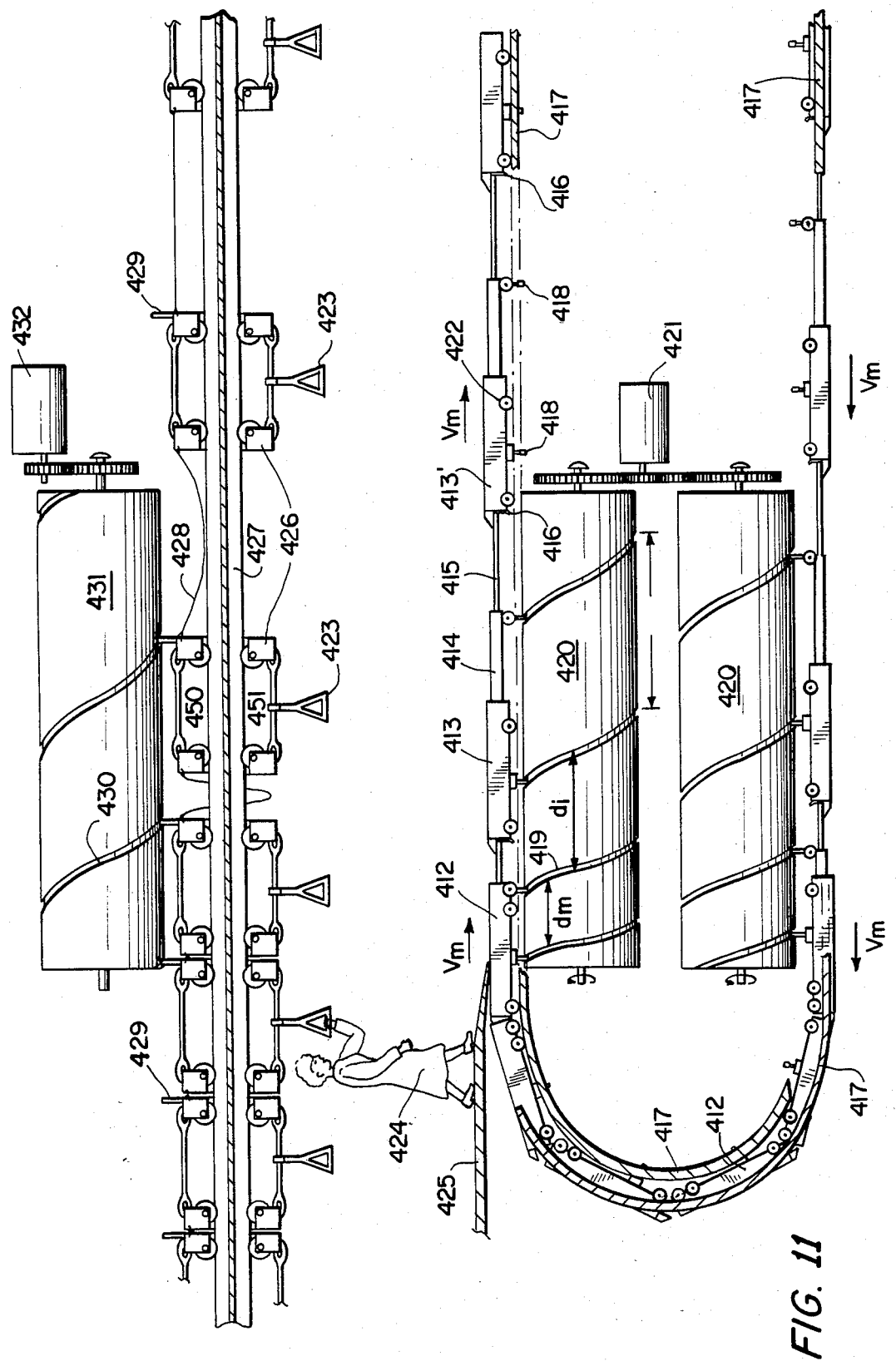
FIG. 11 illustrates a sectional view of an embodiment of a stretchable bandconveyor with two associated threaded rods having a variable pitch thread and an associated stretchable succession of grips with an associated threaded rod.

FIG. 1A illustrates a lateral view of a succession of cars 1 moving from the right to the left. Linking devices 2, such as cables winded around winches, interconnect the cars to one another.

In the embodiment illustrated, starting from point A on the right, the cables are completely unwound and the distance between the cars and the speed of the cars is a maximum. Between points A and B, the cables are progressively wound and the distance between the cars and therefore their speed is reduced.

A station where the cars are loaded and unloaded is positioned between points B and C. In the station the cables are completely wound up such that the cars are adjacent each other and move at a speed which is synchronized with the speed of a bandconveyor (not shown) which moves adjacent the cars to enable passengers to go into or get out of the cars.

After point C the cables are progressively unwound again and the distance between the cars and therefore their speed is progressively increased.

FIG. 1B shows the variation of the speed of the cars as a function of their location.

FIG. 2 shows a horizontal view of two trains of cars 1 going in opposite directions between two bandconveyors 4 which enable passengers to go into or come out of the cars at a station 6. The cars are linked to each other by linking devices 2 such as cables winded around winches (not shown).

The cars may have sliding doors 8 which are automatically opened and closed at the beginning and the end of the bandconveyors. The bandconveyors may comprise endless belts equipped with hand rails 5 and devices 3 which prevent jamming between the station platform and bandconveyor. Safety rails 7 may also be provided to prevent people from putting their hands between cars or from entering into the station until the distance between cars has been reduced to a minimum.

The two rows of cars are separated by a wall 9 to prevent the mixing of the two opposite air flows in order to reduce air drag.

FIG. 3 illustrates a section of the station wherein bandconveyors 4 are positioned on both sides of cars 1. The cars have sliding doors 8, windows 10 and wheels 12 rolling on rails 14.

Each car 1 has secured thereto a rack 16 driven by a toothed wheel 18 on the same shaft 20 as other wheels 22 which are used in driving bandconveyor 4. Shaft 20 is driven by a motor 24 which controls and synchronizes the speed of the cars 1 and bandconveyor 4 within the station 6.

Dotted lines 26 illustrate the section of a tunnel between stations, while dotted line 28 shows the section of the roof of the station.

FIG. 4 is an elevational view of two cars 1 inside a tunnel which is divided in two parts by a wall 30. The right car is seen from the rear side showing a motor 34 driving wheels 36 located under a bench 38. Motor 34 is used mainly to compensate for drag due to friction on the cars, since the energy of deceleration is automatically transmitted with very little loss by the winches and cables to accelerate the cars at the preceding station. A toothed rack 40, similar to rack 16 in FIG. 3, is used to synchronize the speed of car 1 with the speed of the bandconveyor at the station. Reinforcements 42 and rails 44 support and guide the cars. A platform 46 can be used as a walkway for maintenance or for emergency use.

The left car is seen from its front end showing a winch 50 with a part of a cable 52 linking the car to the next one. Two sets of toothed wheels 54 and 56 linked by a chain 58 are shown. Set 54 is on the same shaft as the winch 50, and set 56 is on the same shaft as two other toothed wheels 60 which are driven by a fixed rack 62 placed between the rails before a station. A third shaft supports a toothed wheel 64 driving the second shaft and two other toothed wheels 66 driven by fixed racks (not shown) and placed between the rails after each station.

The appropriate combination of the toothed wheels enables the winch to wind and unwind cable 52 at different speeds. If the fixed racks have in addition a variable path, it is possible to wind and unwind the winch at any desired speed, while using or reproducing a part of the kinetic energy of the car, regardless of the speed of the car. This can provide a relatively constant declaration or acceleration.

As an alternative selection, the winches can be wound and unwound by a motor placed on each car, the motor being started and stopped by, for example, a reed switch carried by the cars and activated by a magnet positioned adjacent the desired track position.

Space 70 is provided which can be used to house devices for automatically opening and shutting the sliding doors 8.

FIGS. 5A and 5B are other partial view of the same car of FIG. 4. FIG. 5A is a view of the bottom, and FIG. 5B is a partial view of a section of the car taken along line BB' of FIG. 4 and 5A.

In addition to the elements shown on FIG. 4, FIG. 5 shows a grooved pulley 72 to guide the cable 52 on the winch 50 and two small toothed wheels 74 guiding the chain 58 on the different toothed wheels 54 and 56. Small wheels 74 are set in rods 76 of which one end 78 is articulated with the car, and the other end 80 is free to move and is guided by rails not shown on the figure in order to automatically set the appropriate transmission ratio between the fixed rack 62 and the winch 50. The free ends 80 of the rods 76 are linked to the car with a spring 82 which keeps the chains under tension.

The chain rods and toothed wheels are, in fact, the various parts of a simple automatic gear-box for automatically coupling the fixed rack 62 with the mobile winch 50. Many other existing devices can be used for the same purpose.

The fixed end 84 of the cable 52 is linked to the next car by springs 86 in order to keep it constantly under tension. These springs also smooth the shock at the beginning and the end of the decleration or acceleration and during gear changes.

The purpose of the different size wheels in the automatic gear box is to wind the winch at a relatively controlled speed in order to have a relatively constant acceleration and deceleration.

It may also be desirable to reduce the shock produced by contact of the large wheel 60 with the rack 62. To this end, the shaft of wheel 60 may be free to move in the direction parallel to the movement of the car and be maintained in a forward biased position by means of springs 90 as shown in FIG. 5C. Additionally, a short rack 62a may be provided in front of rack 62 and biased therefrom by means of a spring 92. Both springs 90 and 92 then help to dissipate the impact shock of wheel 60 with rack 62 or 62a.

Yet another alternative is to replace the toothed wheel 60 by a rubber wheel and the rack 62 by a concrete beam to permit a frictional drive means.

FIG. 6A is a partial view of the bottom of a bandconveyor made of a succession of alternating elements 100 and 102. FIG. 6B is a cross-sectional view of the bandconveyor taken along line BB; of FIG. 6A. Each element 102 slides into the element 100 on its left and is linked to the element 100 on its right by an articulation 103 in order to enable the bandconveyor to be bent. Each element 102 is also linked to its left element 100 by a threaded rod 104 of which one end is attached to the element 102, and the other end slides inside a nut 105 linked to the element 100. The nut 105 is screwed onto or off of the threaded rod 104 by means of gear wheels 106 and 107 driven by a fixed rack 108. The turning of the nut 105 on the threaded rod 104 decreases or increases the distance between the consecutive elements 100 and 102 and makes the corresponding element 102 slide into or out of the element 100.

The bandconveyor is made of an endless succession of such elements 100 and 102 and the speed of these elements vary along their course proportionally to the distance between them. Fixed racks 108 are positioned in appropriate places along the path of the bandconveyor to achieve the desired speed of the elements and corresponding distance therebetween.

FIG. 7 is a sectional veiw of FIG. 6A along line AA' thereof. A hand rail 109 is made of telescoping elements which are fixed on the corresponding components 100 and 102. Car 1 such as described in FIG. 3 is also illustrated along with a device for synchronizing the speed of the car with the speed of the bandconveyor. This synchronizing device comprises racks 111 placed under and fixed to the car components and bandconveyor elements and gear wheels 112 and 113 located in the stations. Racks 111 are similar to racks 16 of FIGS. 3 and 40 of FIG. 4.

FIGS. 8A and 8B are similar to FIGS. 6A and 6B except that the threaded rods 104, the nuts 105, the gear wheels 106 and 107 and the fixed rack 108 are replaced by articulated rods 204 with wheels 205 as shown, with wheels 205 guided by fixed rails 206, having a variable gap. The gap determines the distance between the consecutive elements 100 and 102.

The bandconveyor can be made of more than two alternating elements, one sliding into the other, if it is desired to increase the distance between the consecutive elements and therefore their speed by a factor larger than two. As an alternate solution, the bandconveyor can be made of elements sliding above each other.

It is understood that the embodiments described for controlling the speed and distance of the train of cars are also applicable for controlling the speed and distance of the bandconveyor elements and vice versa.

The cars 1 may also be provided with a device for automatically opening the car doors when the cars arrive at the station. Such a device is illustrated in FIGS. 9A and 9B. In FIG. 9A, doors 310 are shown in their closed position, whereas in FIG. 9B, the doors 310 are open. Cars 311 and 312 are illustrated together with levers 301, 302, 303 and 304 and springs 307, 308 and 309. When the cars 311 and 312 approach one another, lever 301 is pushed in thereby moving lever 302 around an axis 305. This in turn causes lever 303 to move lever 304 around its axis 306. The ends of levers 302 and 304 are linked to springs 308 and 309 to stretch springs 308 for opening the doors (FIG. 9B), and to stretch springs 309 to close the doors (FIG. 9A). Spring 307 biases lever 301 in the extended position (FIG. 9A) when the cars are apart.

Lever 313 may be utilized to lock the doors, and thereby prevent their opening, until the cars are sufficiently close together to insure speed synchronization with the bandconveyor. Any number of mechanisms may be employed for this purpose such as a single lever and lifter arrangement.

FIG. 10 is a schematic diagram of means for controlling the distance and speed of cars 401 without mechanically interconnecting the cars. The system comprises a motor 402 contained within each car 401 for powering same. A servomechanism 404 is also provided which is connected to sense the speed of rotation of the car wheels 403 and compare same with a reference signal from reference source 405 and to provide an output control signal p to motor 402. Reference source 405 provides a reference signal $V_0$ when the cars are far apart and away from the station. At a specified point before a station, reference source 405 provides a signal $V_x$ which gradually reduces to a value $V_1$ representative of the minimum speed of cars 401 within the station. The output signal p to motor 402 enables the motor to drive the cars to match the desired speed $V_x$.

Elements 406 and 407 are utilized for measuring the distance between the cars 401. Element 406, for example, may be a sonar or radar transceiver which emits signals which are reflected by mirror 407 and received on the transceiver. Alternately, a laser beam may be utilized wherein a measure of the beam divergence angle A is proportional to the distance between cars as shown by elements 408 and 409 in FIG. 10. The output of element 406 is proportional to the instantaneous value of the distance between adjacent cars. This signal is fed to servomechanism 410 to be compared with a signal $L_x$ from distance reference source 411. The signal $L_x$ is representative of the theoretical value of the distance between cars. $L_x$ varies from a maximum of $L_o$ (cars far apart-away from station) to a minimum of $L_1$ (cars close together—inside station). An error signal, E, from servomechanism 410 serves as an additional correction signal for servomechanism 404.

Reference sources 405 and 411 may be activated to change the reference signal from $V_o$ to $V_x$ and $L_o$ to $L_x$ respectively by a mechanical or electrical tripping device positioned adjacent the car path. The electrical tripping device may, for example, be a reed switch carried by the cars and activated by a magnet positioned adjacent the desired track position.

Turning now to the variable pitch screw rod and specifically to FIG. 11 which illustrates a transportation device made of an endless succession of alternating elements such as 413, 414, 415, which are dimensioned to slide inside of each other in a manner similar to those depicted in FIGS. 5A and 5B. The variable pitch screw rod is used as a device adjacent to the path followed by the elements. It should be understood that while the embodiment described utilizes the elements to form an expandable conveyor segment or component, theoretically at least, any number more than two could be used. The innermost element 415 is connected to the outermost adjacent element 413 by articulation member or hinge 416 which enables a succession of elements to move along a closed loop path 417. The elements are provided with retaining means (see FIG. 12B) for preventing them from sliding completely apart from each other, either when the alternating elements are pushed fully within one another or fully stretched apart from each other.

All the alternating elements except one, which is preferably either the innermost element (i.e., 415) or the outermost element (i.e., 413) (not visible), have one or more rods 418 fixed at one end to the element. The other end is adapted to slide in grooves 419 of endless screws 420, which as discussed below may have either a variable pitch thread or a constant pitch thread, depending upon its location along the closed loop path 417. Each rod 418 is fixed on its element such that it is at a predetermined distance, i.e., the minimum distance $d_m$ or the maximum distance $d_M$, from the adjacent rods when the adjacent elements are respectively fully compressed or fully stretched.

The pitch of the thread of the endless screws may vary continuously and progressively from a minimum $d_m$ to a maximum $d_M$ or vice versa, or from some fraction of $d_m$ to the same fraction of $d_M$, as described below in connection with FIG. 15.

Figure 15:
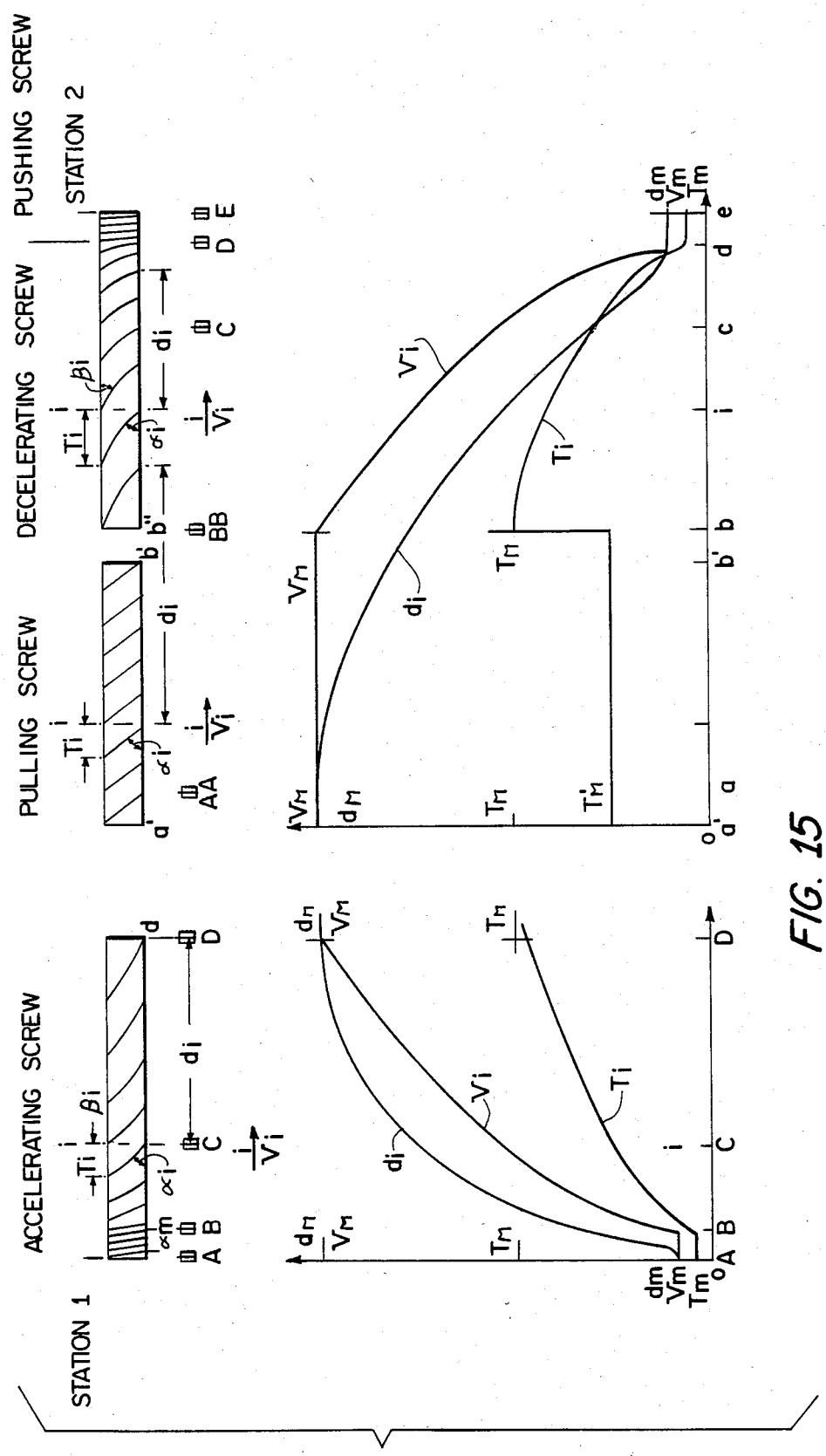
FIG. 15 illustrates in schematic form various threaded rods of the type which may be utilized with the present invention and graphical depictions of the speed of the associated cars, distances between adjacent cars and the magnitude of the pitch of the rod threads.

The endless screws may be driven by motors or the like 421 such that the sliding of the rods 418 in the grooves 419 operates to drive the attached element at a speed varying from $V_m$ to $V_M$ and the distance between two adjacent rods is varying from $d_m$ to $d_M$ with $V_m/V_M = d_m/d_M$ (see FIG. 15).

It is important to fully understand the relationship between the elements, e.g., 412–415, the rods, e.g., 418, and the screws 420. Between two consecutive screws 420 the elements are free to slide one within the other and to move freely along the closed loop path 417. However, when the elements are positioned along the screws 420, they are linked to the groove 419 of the screws 420 by the rods 418 associated with the particular elements. Therefore the movements of the elements will depend upon and will be caused by the displacement of the grooves 419 due to the rotation of the screw 420. Therefore, the speed of the elements and their distance apart will depend on the thread pitch of the grooves.

The elements are connected to each other such that their distance apart can vary between a minimum, ($d_m$) and a maximum ($d_M$) when there are no forces acting on them. When the elements are pushed against each other, their distance apart is always the minimum distance ($d_m$), which is a predetermined constant distance. When the elements are pulled away from each other, their distance apart is always a maximum distance ($d_M$), also a predetermined constant distance. Since the rods 418 are positioned at a fixed point on the elements, their distance apart from each other will vary as the elements vary from a minimum distance $d_m$ to a maximum distance $d_M$.

When any particular element approaches a rotating screw 420 (because it is pulled by the preceding element which has already engaged the groove 419 of that screw and which is therefore driven by that screw), the thread pitch of the groove of that screw is such that the speed of the preceding element is constant and equal to the maximum speed $V_M$ over a portion of the screw at least equal to $d_M$ the entrance to the groove of a screw 420 is positioned such that the rod 418 associated with a particular element will coincide with the entrance when the associated rod of the preceding element is at a point along the screw located at a distance $d_M$ from the entrance to the screw as measured along the axis of the screw. Therefore the succession of rods 418, associated with a succession of elements, will automatically engage the groove 419 as long as they are pulled by the preceding element at a distance $d_M$ from the preceding element.

Thereafter the pitch of the thread of the screw may vary to reduce the speed of elements and their distance apart. In the case of such a deceleration screw, the thread pitch on the latter part of said screw will be such that the speed of said element is at a minimum ($V_m$) and the distance from one element to the preceding element already disengaged from the screw is at a minimum $d_m$ over a distance at least equal to $d_m$.

After disengagement from the screw, the succession of elements push each other at the minimum speed $v_m$ until they reach the following screw. The distance between their associated consecutive rods is therefore $d_m$.

The engagement of the rods 418 with the groove 419 of next screw 420 is automatically assured if the thread pitch of the following screw is such that the speed of the preceding element already engaged in the groove of that screw is equal to $v_m$ and the entrance of the groove of that screw is positioned such that the rod associated with the element will coincide with the entrance when the associated rod of the preceding element is at a point along the groove of the screw at a distance $d_m$ from the entrance to the groove as measured along the axis of the screw.

It is important that all the elements between two consecutive screws are always in a condition whereby they are either being pulled or pushed in order to ensure proper engagement of between the rods 418 and the grooves 419. Therefore, the number of elements between the screws must be constant. This is easily assured by having the rotational speed of the screws synchronized such that an element 418 leaves a screw simultaneously as a preceding element enters the following screw.

Each element may also be equipped with wheels 422. The maximum distance between two consecutive wheels 422 is approximately equal to the length of any particular elements, e.g., 413–514, which is considerably smaller than the maximum distance between two consecutive identical elements, e.g. the outermost elements (such as 413 and 413'), when the elements are fully expanded. If elements sliding above one another, as opposed to within each other, are used, all the elements would be identical and their length would therefore equal the maximum distance between the outermost consecutive elements of the sliding arrangement. The distance between the wheels supporting elements which slide above each other is therefore relativly large when the elements are fully expanded. Their structural geometry therefore must be such that they can carry substantially larger loads over their substantially longer span. This increases the inherent rotation of such elements when they slide above one another. It is therefore far less practical to use elements which slide above each other than within one another.

The top of FIG. 11 shows an endless succession of hand grips 423 moving above the elements, generally 412, and located within easy reach of passengers 424 to facilitate their transfer from a fixed platform 425 to the element 412, and vice versa and to enable the passengers to maintain their equilibrium on the elements during accelerations, decelerations and travel along the closed loop path.

The hand grips are fixed on overhead trolleys or the like 426 moving along rails 427 and connected to each other by cables 428 such that the distance between two adjacent grips is either minimum and proportional to $d_m$ or maximum and proportional to $d_M$ when the overhead trolleys 426 are either compressed against or pulled apart from each other. The overhead trolleys further include rods 429 which are free to slide along the grooves 430 of endless screws 431 adjacent the rail 427. Each trolley 426 engages the rail 427 by means of upper wheels 450 and lower wheels 451 although it should be understood that either more or less than the four wheels depicted can be used.

In lieu of hand grips, other driven safety or comfort devices can be used with the bandconveyor. For instance, a guard rail positioned alongside the bandconveyor or seating means suspended from the overhead rail or other such devices may be used.

The screws 431 have variable threads proportional to the threads of the screws 420 and are driven by motors 432 or the like at a speed proportional to the speed of the screws 420, such that the hand grips move at a speed equal to the speed of the element below it along the visible portion of the closed loop path of the element.

FIG. 12A illustrates a detailed view of the elements 413, 414 and 415, the articulation 416, the thread following rods 418, the variable pitch thread grooves 419 and the wheels 422. The drawing further depicts the teeth 433 or the like of a comblike device and the side 434 of the grooves on the load carrying surface of the top of elements (as are more fully described and illustrated hereinafter in FIG. 13).

Figure 12B:
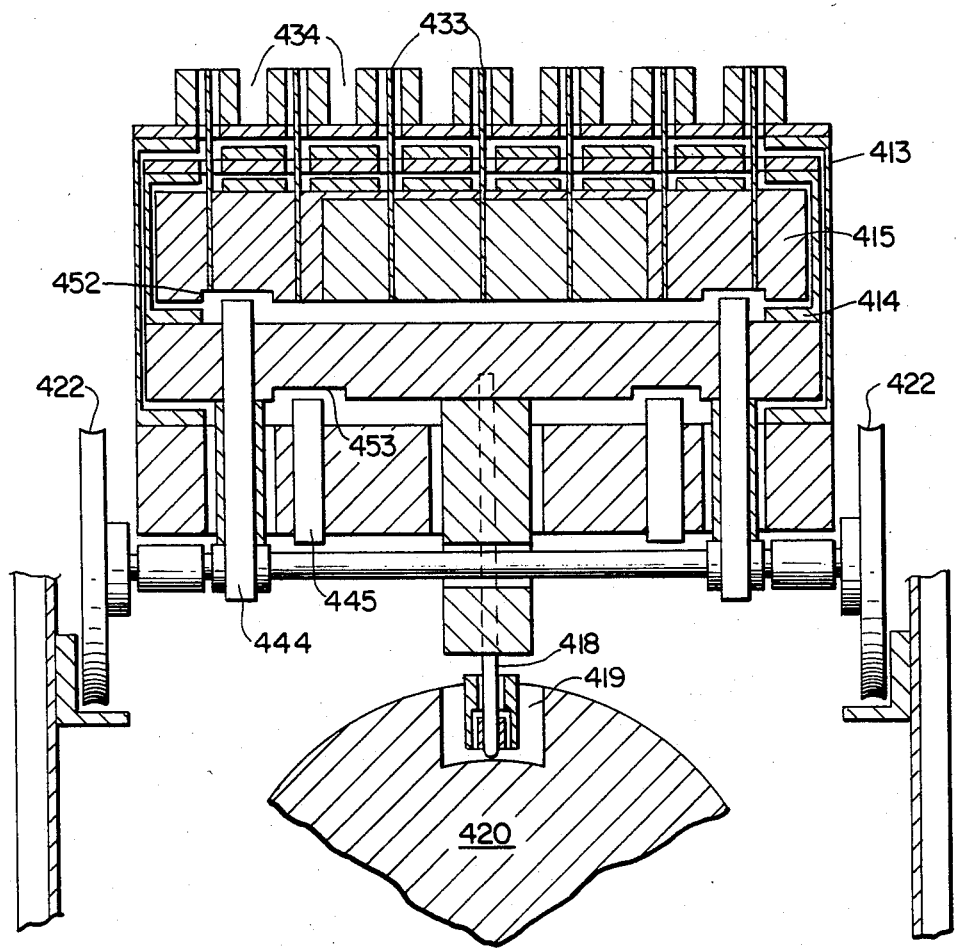
FIG. 12B illustrates a cross sectional view along section AA of FIG. 12A.

FIG. 12B is a cross section of FIG. 12A depicting an exemplary retaining device 444, 445 for preventing the components from sliding completely apart from each other. The retaining means includes slots 452 and 453 positioned to accept the slide members 444 and 445, respectively. At each end of the slots 452 and 453 are positioned stops (not shown) to restrain the movement of slide members 444 and 445 within their respective slots. Thus, the elements 413, 414 and 415 can be compressed and stretched but cannot be stretched apart or pushed one through the other. It should be understood by the artisan that other retaining means can be used and that more or less than three elements can be used to comprise a succession of alternating elements. The "teeth" 433 and grooves 434 which form the load carrying surface are clearly understood with reference to FIG. 12B.

FIG. 13 illustrates a detailed view of a portion of the surface and understructure of an embodiment having four alternating elements 413, 414, 415 and 415', connected to the adjacent element 413' by an articulation 416. It should be understood the magnitude of the variations in the dimensions of the surface details of the components has been exaggerated for clarity. Teeth 433 are set either to the outer element 433 or the innermost element, in this case 415'. The teeth 433 slide in slots 435 provided in the load carrying surface of 413, 414 and 415. The slope of the edges 451 of the teeth 433 and the slope of the leading edges 450, 460 and 470 of the carrying surface of 413, 414, 415, respectively, are shallow enough and the width of the slots 435 and the distance between the teeth 433 are small enough to prevent loads or objects of reasonable size from being squeezed between the edges of the elements 413, 414, 415 and the teeth 433 when the elements slide within one another.

FIG. 13 also illustrates grooves 434 on the top surface of the outermost element 413 to permit the teeth of a comb-like device set on the fixed platform 425 (FIG. 11) to slide within the grooves 434. The width of those grooves 434 and the distance between those grooves are small enough to prevent the trapping of a load or passenger between the top surface of the elements and the teeth of the comb-like device on the platform. The teeth 433 engage slots 435 in the assembly of elements 413, 414 and 415 such that, when elements 413, 414 and 415 are compressed together, the grooves 434 of the outermost elements 413 and 413' face each other and therefore make a continuous groove.

Figure 14A:
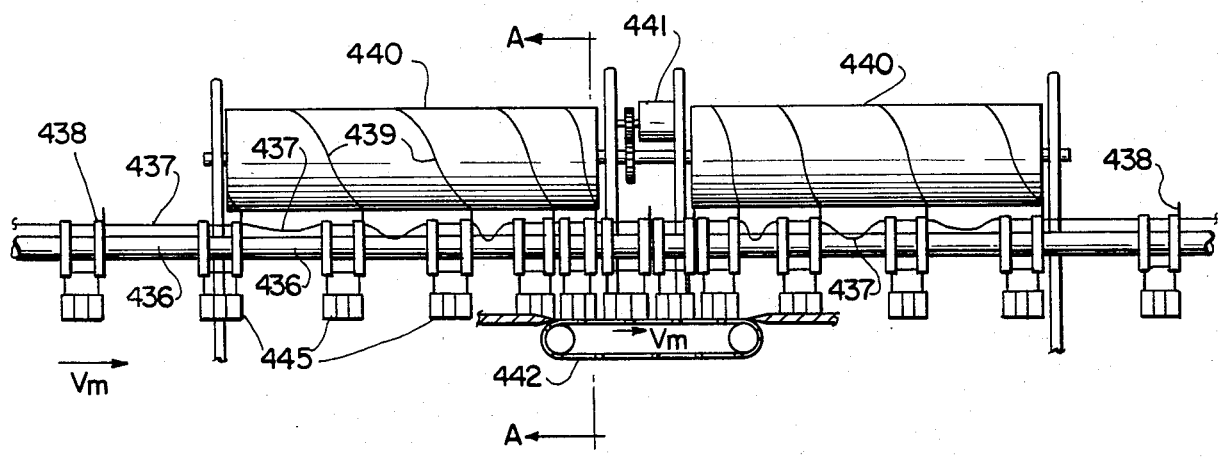
FIG. 14A illustrates a sectional view of a succession of cars in the vicinity of and within a station having two associated variable pitch threaded rods.
Figure 14B:
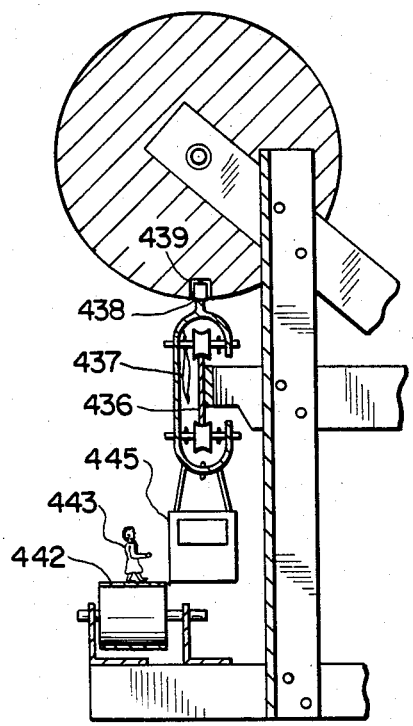
FIG. 14B illustrates a cross section through section AA of FIG. 14A.

FIGS. 14A and 14B illustrate an alternative embodiment of the invention and depict, respectively, a lateral and a cross-sectional view of a succession of cars 445 suspended from a monorail 436 and connected to each other by cables 437 and having rods 438 which can slide within grooves 439 made on endless screws 440 having a variable pitch thread.

The screws are driven by motors 441 or the like and the thread pitch is designed so that the cars are pulled from one screw (the leftmost screw in FIG. 14A) to the next screw at a constant maximum speed $V_M$ or so that the cars 435 are pushed from one screw to the next at a constant minimum speed $v_m$ and that the rightmost screw in FIG. 14A will progressively accelerate the cars 445 to a constant maximum speed $V_M$ in accordance with the pitch designs illustrated in FIG. 15.

A bandconveyor 442 may be provided to move along synchronously with the cars, on that portion of the car path were the car speed is at or near a minimum, i.e. at a passenger station, to permit the transfer of passengers 443 from the bandconveyor to the cars and vice versa. It should be understood that the cars 445 of FIG. 14A generally correspond to the succession of grips 423 of FIG. 11 and that the bandconveyor 442 of FIG. 14 may be a succession of elements (e.g. 413, 414, 415) as depicted in FIG. 11 except that the maximum speed of the elements of the bandconveyor is equal to the minimum speed of the cars and therefore the speed of the said elements is equal to the speed of the cars along a portion of the visible part of the closed loop paths of the elements, thereby permitting passenger transfer only along that portion.

It should be understood that the relationship between the endless screws driving the bandconveyor and the endless screws driving the cars has to be such that at the location of the transfer portions, the car speed is constant and at its minimum and synchronized to the bandconveyor speed which is at its maximum.

Turning now to FIG. 15, there is depicted at the top of the figure, in diagram form, an accelerating screw (or threaded rod) placed at the end of station 1 (which corresponds, for instance, to the rightmost screw in FIG. 14A) and the development of the pulling screw, decelerating and pushing screw placed at the beginning of the next station (station 2), which may correspond to the leftmost screw in FIG. 14A, with associated diagrams of the speed of the cars, and the distances between adjacent cars and adjacent threads. It should be understood that this diagram specifically pertains to the embodiment of FIG. 14 but the explanation of the threaded rods is also applicable to the embodiment of FIGS. 11–13. Assume that cars A and B are moving from left to right at a constant speed equal to the minimum speed $v_m$; and, therefore, the thread (or pitch) of the endless screw is constant and equal to a minimum $T_m$. Therefore, we have:

$$T_m = \cotg \alpha_m \cdot \pi D, \quad (1)$$

where $\alpha_m$ is the angle between the groove and the axis of the screw and D is the diameter of the screws.

$$v_m = \omega_1 \cdot T_m \quad (2)$$

where $\omega_1$ is the rotation speed of the screw expressed in number of revolutions per unit of time.

As the car A moves from its illustrated position toward that of car B in FIG. 15 at a constant speed $v_m$, the distance between the middle of the car A and the middle of the following car on its left (not shown on the figure) is constant and equal to a minimum $d_m$ which should be a multiple of $T_m$ (for example, in this case $d_m = 4 T_m$). This is important to assure that the following car will approach the screw in such a way that its rod will exactly engage the groove of the endless screw. In practice, those cars may be one against the other moving along the bandconveyor placed at the station to permit the transfer of passengers from the station to the cars. The length of the cars should be equal to $d_m$ and the width of the groove should be large enough at its entrance to permit small fluctuations of $d_m$ or the rods may be fixed to their associated car by a flexible means to allow them some degree of lateral movement. As the screw rotates, the distance $d_i$ between the car A and the succeeding car B increases, since car B is moving during that same period of time from its position as illustrated in FIG. 15 toward the position of car C at an increasing speed $v_i$ along the groove which has an increasing thread (or pitch) Ti which makes a decreasing angle $\alpha_i$ with the axis of the screw.

$$v_i = v_m + at_i \quad (3)$$

where a is the desired acceleration and $t_i$ is the same taken by the car B to go from B to the point i. For simplicity it is assumed that the desired acceleration is constant. Otherwise equation (3) would be:

$$v_i = v_m + \int_o^{t_i} a \, dt \quad (3')$$

and all the following equations should be revised accordingly. If $x_i$ is the distance from the initial position of car B to i, we have:

$$x_i = v_m \cdot t_i + at_i^2/2 \quad (4)$$

which permits the calculation of $t_i$ as a function of the position of i on the screw and therefore of $v_i$.

We also have:

$$v_i = \omega_1 \cdot \pi D \cot g\, \alpha_i, \text{ with } (\omega_1, \text{ a constant})\quad (5)$$

This permits the calculation of $\alpha_i$ but $T_i \neq D \cot g\, \alpha_i$ since the development of the groove is a curve and since $\alpha_i$ is varying.

But if $(i-1)$ is the point on the groove to the left of $i$ on the line parallel to the axis of the screw, we have $$x_{i-1} = V_m \cdot T_{i-1} + a t_{i-1}^2/2 \quad (6)$$

where $t_{i-1}$ is the time taken by the car B to go from point b to point $i-1$.

The time of one full revolution of the screw can be calculated as follows:

$$t_i - t_{i-1} = 1/\omega_i \quad (7)$$

The distance along the axis of the screw corresponding to one turn of the screw can be written as $$x_i - x_{i-1} = T_i \quad (8)$$

where $T_i$ is the pitch of the screw.

In this example, where the screw must make four revolutions to get each car to the position of the preceding car and where $i+1$, $i+2$, $i+3$, and $i+4$ are the successive points of the groove at the right of $i$ and on the same axis parallel to the axis of the screw, $$d_i = T_{i+1} + T_{i+2} + T_{i+3} + T_{i+4} = X_{i+4} - X_i \quad (9)$$

With those equations it is possible to calculate $v_i$, $T_i$, $\alpha_i$ and $d_i$ at any point between b and d as shown on the diagram.

At the point of d along the screw axis the speed of the car is equal to the maximum speed and the angle between the groove and the axis of the screw is a minimum and equal to $\alpha_M$. Assuming the screw does not end at point d, the distance $T_{i+1}$ between point d and a following point on the groove to the right of d and on the axis of the screw would be equal to $T_M$ and the distance between the car D and the preceding car (i.e. to the right of D) is equal to $d_M = 4 T_M$ (i.e., the cable is fully stretched and the acceleration screw is no longer necessary). Under these conditions:

$$T_M/T_m = d_M/d_m = V_M/v_m \quad (10)$$

but $T_D \neq T_M$ as clearly shown in the lefthand graph of FIG. 15.

The portion of the accelerating screw between a and b may not always be necessary inasmuch as at station 1 the cars abut against each other and are therefore pushed at a uniform speed $v_m$ by a pushing screw located at the beginning of station (to the left of A and not shown on the figure).

As car D leaves the accelerating screw, it is pulled by the preceding cars which are themselves pulled by the pulling screw located along the car path toward the following station and shown in FIG. 15 to the right of the accelerating screw.

The forces developed by the pulling screw may be limited to what is necessary to overcome the energy loss between the two stations due to friction and the like. The thread is constant and the length of the pulling screw must be at least equal to $d_M$ in order to always have at least one car pulled by the screw. (The car being pulled will in turn pull all the following cars.) The distance between a car AA and the car BB is equal to $d_M$ and the distance between the car AA and the car D is a multiple of $d_M$.

Again it is important that the cars should preferably approach the pulling screw in such a way that their associated rods will properly engage the groove of the pulling screw. This will be automatically done if the length of the pulling screw is equal or greater than $d_M$ and if $d_M$ is a multiple of the thread pitch of the pulling screw $T'_M$ (here $d_M = 8 T'_M$). Note that in the example $d_M$ is equal to the length of the cable plus the length of the car.

In practice since the cables are not infinitely rigid, $d_M$ can vary slightly and therefore the entrance of the groove at point a' must be wide enough to provide for the small variations of the distance between the car BB (when at b') and the car AA (at a'), since the car AA is pulled by the car BB.

The pulling screw can be attached to a decelerating screw, but in the case illustrated the pulling screw is separate and rotating at twice the speed, $\omega_i' = 2\omega_i$, of all the other screws in order to keep the angle $\alpha_i$ large and therefore the stresses perpendicular to the direction of motion of the cars as small as possible. In this case, we therefore have:

$$T'_M = T_M/2 \quad (11)$$

and $$\cot g\, \alpha^1 = \cot g\, \alpha_M/2 \quad (12)$$

It is also within the scope of the invention to have more pulling screws at different locations between the stations in order to reduce the energy lost from friction or other sources between two pulling screws where the distance between the stations is large. Alternatively, the system may have small motors on each or some cars to offset the frictional and other energy losses.

The decelerating screw should be very close to the last pulling screw, since the car BB should not lose any significant speed between the points b' and b" and the cables to the left and right of the car BB are already loose since $d_i$ starts to decrease from point a' at a distance $d_M$ from b'.

The decelearting screw is exactly the opposite of the accelerating screw if a corresponding deceleration is desired. Similar mathematical formulas therefore pertain.

In the two embodiments discussed above using threaded rods to drive the components, the rods are placed at fixed locations and the cars or handrail trolleys or bandconveyor elements or the like (components) track the threaded rods. They therefore differ from the description of the conveyor of FIG. 6 where the threaded rods are placed on the components in lieu of cables and are therefore of a much larger number but are also smaller. The threaded rods of FIGS. 11-15 function in a manner somewhat analogous to the rack 62 or 108 of FIGS. 5 and 6 and the rods associated with the elements are somewhat analogous to the set of teethed wheels 66 and 107 of those figures.

When a small number of fixed rods is used, their size can be quite large, in fact for some applications several hundred feet long. They will obviously have to be supported between their extremities.

Figure 16:
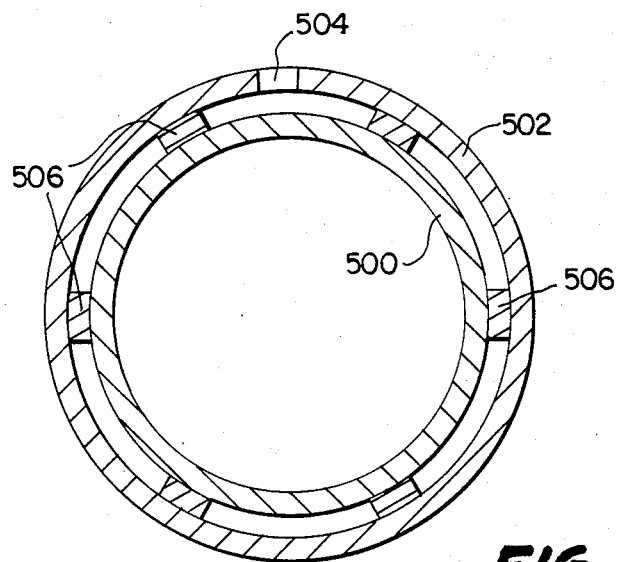
FIGS. 16A and 16B depict sectional and side views respectively of a rod core in accordance with the present invention.
Figure 16:
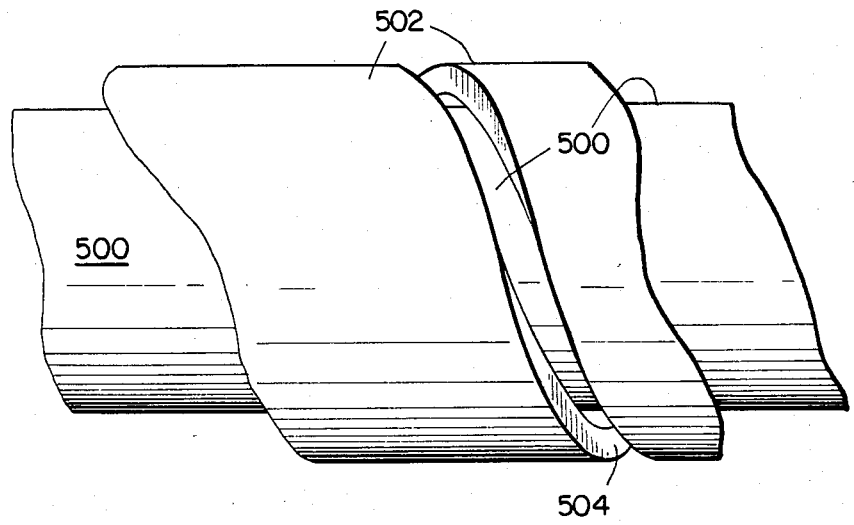

One relatively easy way to construct such rods is to use steel pipe as the "core". As depicted in FIG. 16, a steel core 500 is coaxially disposed within an outer pipe 502 in which a groove following the appropriate thread path and cut to the appropriate width has been formed. The two pipes are rigidly joined by either metallurgical bonding (e.g. welding) or mechanical bonding (e.g. screws). Advantageously, the inner pipe can be filled with some sound deadening material.

Alternatively, the inner pipe may be a frame welded or otherwise bonded to the outer pipe.

The assembly will then be capable of transmitting forces to the cars from the motors placed at the ends of the pipe. Standard 32- and 36-inch still pipes are sufficiently strong for most practical applications.

When the distance between stations is large, it is recommended that small motors be provided on some or all the cars to offset the energy losses due to friction and the like in order to maintain a reasonable tension in the cables. These motors are preferably coupled with devices for measuring the tension in the cables pulling the associated cars. Switching devices would also preferably be provided to start the motors automatically when the cable tension exceeds a predetermined stress and to stop the motors automatically when the tension is less than a smaller predetermined stress.

The foregoing description of preferred embodiments of the invention have been presented for purposes of illustration and description. The description is not intended to be exhaustive or to limit the invention to the precise forms disclosed, and obviously many modifications and variations are possible in light of the above teachings. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A transportation device, comprising:
    a plurality of successive load carrying components, each of said components being connected to adjacent components by means which permit the distance between said adjacent components to vary from a mininum distance to a maximum distance and permit said components to move in a closed loop path;
    a plurality of endless screws with grooves of predetermined thread pitch patterns and means for rotating said screws;
    means associated with said components for engaging said components with said grooves when said components move along said screws, said patterns being arranged whereby the distance between adjacent components varies between said maximum distance and said minimum distance and the speed of said components varies between a maximum speed and a minimum speed as said means moves along the grooves of said endless screws.

2. The transportation device of claim 1 further comprising motors on at least some of said load carrying components to help said components move along said closed loop.

3. The transportation device of claim 2 further comprising means to measure the tension in the connecting means and means operable to start said motors when said tension is less than a predetermined tension and to stop said motors when said tension is greater than a predetermined tension.

4. The transportation device of claim 1, wherein said components comprise at least two elements, said elements being adapted to slide within one another whereby the distance between two adjacent components is equal to a constant maximum distance when said elements are completely expanded and to a constant minimum distance when said elements are contracted within each other.

5. The device of claim 1, wherein said means associated with said components comprises rods fixed on said components and having an end adapted to engage said grooves as said components move along said endless screws.

6. The transportation device of claim 1, wherein said endless screws are positioned along said path and said means for rotating said endless screws rotates each of said screws at a synchronous speed.

7. The device of claim 6, wherein said synchronous rotating speed is operable to maintain the number of components between two consecutive screws constant and wherein adjacent components are maintained at either said minimum distance or said maximum distance when traveling along portions of said closed loop path between screws.

8. The device of claim 7, wherein the speed of said components is substantially constant when said components move along portions of said path between consecutive endless screws.

9. The transportation device of claim 1, wherein said components support a surface for conveying loads, said surface being expandable or contractable in length as said component distance increases or decreases, thereby forming a bandconveyor.

10. The transportation device of claim 1 further comprising at least one bandconveyor, positioned along a portion of said path between two consecutive endless screws where the distance between said components is at said minimum and said components are traveling at a generally constant speed and wherein the speed of said at least one bandconveyor is synchronized with said components along said portion of said path for permitting passengers to transfer from said bandconveyor to said component or from said component to said bandconveyor.

11. The transportation device of claim 1 or 10, wherein said components are cars.

12. The transportation device of claim 10, wherein said bandconveyor comprises a succession of load carrying elements driven in a second closed path by a second set of rotatingly driven endless screws having a variable pitch thread pattern wherein said thread pattern of second set of endless screws their speed of rotation and said pattern are such that the maximum speed of said bandconveyor is synchronized to the minimum speed of said components and further wherein the positioning of said closed paths are such that said bandconveyor and said components are adjacent to each other along portions of said closed loop paths where passengers transfer from said components to said bandconveyor or from said bandconveyor to said components.

13. The transportion device of claim 12, wherein said elements comprise a plurality of members adapted to slide one within another whereby the distance between two adjacent elements is equal to a constant maximum distance when said members are completely expanded and to a constant minimum distance when said members are contracted within each other.

14. The transportation device of claim 12, or 13, further comprising:
a plurality of auxiliary devices;
means for moving said auxiliary devices along another closed loop path having portions adjacent to said second closed loop path; and
means for controlling the speed of said devices and their distance apart whereby said speed and distance are generally synchronized with said elements along said portions of said other closed loop path.

15. The transportation device of claim 14, wherein said devices are hand grips.

16. The transportation device of claim 14, wherein said devices are protection barriers.

17. The transportation device of claim 14, wherein said devices are seating means.

18. The transportation device of claim 14, wherein said auxiliary devices are adapted to be either separated or abutting and connected together by flexible connectors whereby the distance between two adjacent devices is generally constant and at a maximum when said devices are separated and is generally constant and at a minimum when said devices are abutting each other.

19. The transportation device of claim 18, wherein the means for controlling the speed of the devices comprises:
a plurality of threaded rods positioned at locations along said other closed loop path;
means connecting said devices to said threaded rods when said devices move along said threaded rods; and
said means for moving said devices comprising means for rotating said threaded rods.

20. The transportion device of claim 19, wherein said means for connecting said devices and said threaded rods comprises rods fixed to said devices and having a projection for slidingly engaging said threaded rods as said devices move along said threaded rods.

21. The transportation device of claim 1 or 4 or 9 further comprising:
a plurality of auxiliary devices;
means for moving said auxiliary devices along another closed loop path having portions adjacent to said closed loop path; and
means for controlling the speed of said devices and their distance apart whereby the speed and distance of said devices are generally synchronized with said components along said portions of said other closed loop path.

22. The transporation device of claim 21, wherein said devices are hand grips.

23. The transportion device of claim 21, wherein said devices are protection barriers.

24. The transportation device of claim 21, wherein said devices are seating means.

25. The transportation device of claim 21, wherein said auxiliary devices are adapted to be either separated or abutting and connected together by flexible connectors whereby the distance between two adjacent devices is generally constant and at a maximum when said devices are separated and is generally constant and at a minimum when said devices are abutting each other.

26. The transportation device of claim 25, wherein the means for controlling the speed of the devices comprises:
a plurality of threaded rods positioned at locations along said other closed loop path;
means connecting said devices to said threaded rods when said devices move along said threaded rods; and
said means for moving said devices comprising means for rotating said threaded rods.

27. The transportation device of claim 26, wherein said means for connecting said devices and said threaded rods comprises rods fixed to said devices and having a projection for slidingly engaging said threaded rods as said devices move along said threaded rods.

28. The transportation device of claim 1 or 4 or 9 or 13, further comprising a plurality of ridges positioned on a load carrying surface of at least some of said components, said face further having slots whereby the ridges of some of said components slide within the slots on the load carrying surface of other of said components.

29. The transportation device of claim 1 or 4 or 9 or 13, wherein said components comprise at least two elements, an outermost element and an inner element adapted to slide within said outermost element to contract said component, said outermost element having a grooved load carrying surface and said inner element having ridges adapted to slide within said groove when said elements slide together.

30. A transportation device, comprising:
a plurality of successive load carrying components arranged in groups, said groups being connected, at least one component of each of said groups being adapted to slide within an adjacent component of said group from a fully extended position to a fully contracted position;
means for moving said components along a closed loop path; and
means for controlling the speed of said components and their distance apart along substantially said entire closed loop path, said controlling means including endless screws positioned at locations along said path and operable to move said components along said path without rotation of said components in a direction transverse to said closed loop path.

31. The transportation device of claim 1 or 30, wherein said endless screws comprise an inner support and an outer pipe, said outer pipe having a groove therein to define the thread of the screw, said support and outer pipes being fixed together whereby forces between said components and said means for moving said components may be transmitted to said components by said pipes.

32. The transportation device of claim 30, further comprising rods fixed on said components and having an end adapted to engage said endless screws when said component moves along said endless screw.

33. The transportation device of claim 30, further including means for preventing adjacent components from sliding completely apart from each other.

34. The transportation device of claim 33, wherein the components between two consecutive endless screws are either completely extended or completely contracted amd their speed is approximately constant as they move along portions of said path between consecutive endless screws.

35. The transportation device of claim 30, wherein the distance between rods of adjacent components is substantially constant and at a maximum when said components are extended and substantially constant and at a minimum when said components are contracted.

36. The transportation device of claim 30, wherein at least some of said endless screws have a variable thread pitch whereby the distance between two adjacent components varies progressively from a maximum distance to a minimum distance or from a minimum distance to a maximum distance and the speed of said components varies from a generally constant maximum speed to a generally constant minimum speed or from a generally constant minimum speed to a generally constant maximum speed as said components move along said at least some endless screws.

* * * * *